Patented Nov. 23, 1937

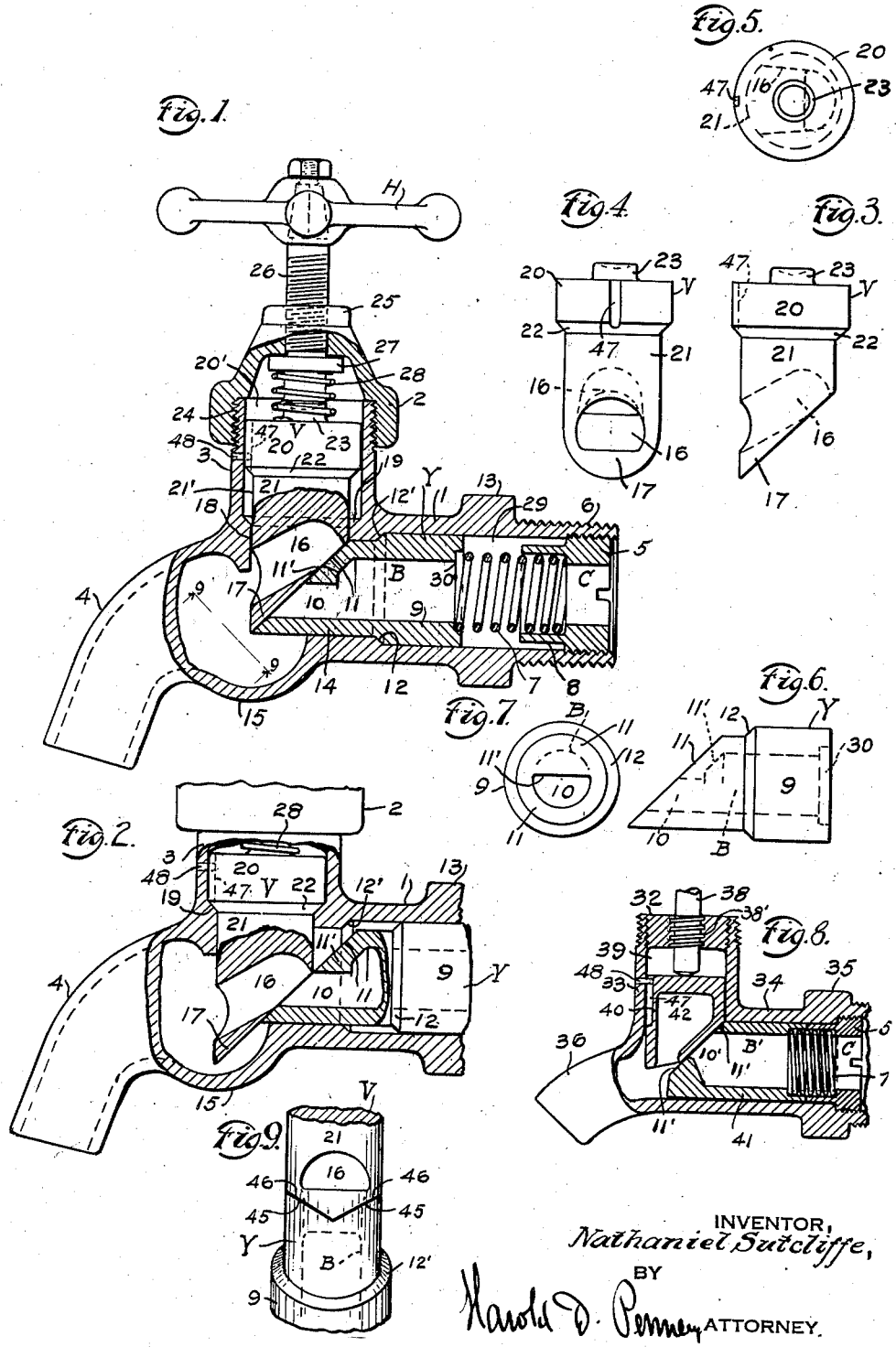

2,099,992

UNITED STATES PATENT OFFICE 2,099,992

VALVE

Nathaniel Sutcliffe, Newark, N. J.

Application May 21, 1936, Serial No. 80,924

12 Claims. (Cl. 251—20)

The present improvement relates to valves or cocks for controlling the flow of fluids, such as steam, water, oil, and the like, and in the present instance it is shown as applied to a bib or faucet.

One of the important features of the present improvement is in the construction of the ported valve members and in the mode of operation of the valve for opening and closing communication between the ports therein.

Another feature is in the operation of the line valve member.

Still another feature is in the manner of cutting off the leakage fluid flow by auxiliary stop faces.

The foregoing and still further features of advantage will be apprehended as the herein description proceeds, and it will be obvious that modifications may be made in the structure herein disclosed without departing from the spirit hereof or the scope of the appended claims.

In the drawing,

Fig. 1 is a fragmentarily sectioned view, in elevation of a faucet showing the present improvement;

Fig. 2 is a fragmented section, similar to Fig. 1, showing the valve members in the opened position;

Fig. 3 is a side view, in elevation of the closure valve member;

Fig. 4 is a front view thereof;

Fig. 5 is a plan view of Fig. 3;

Fig. 6 is a side view of the line valve member;

Fig. 7 is an end view thereof, taken on the seated end thereof;

Fig. 8 is a reduced partially sectioned view of a modified valve; and

Fig. 9 is a fragmentary view of further modified valve members removed from the valve body, about as viewed from the line 9—9, Fig. 1, looking in the direction of the arrows.

In Fig. 1, the valve body 1 is provided with an upstanding cylindrical valve body portion 3, which is threaded to receive thereon a cap 2, to act as a closure for the portion 3, and which cap 2 is threaded at its end 25 to operatively receive therein a threaded valve operating stem 26. The stem 26 has attached thereto a handle H for manual operation of the stem up and down in the cap 2.

The body 1 is provided at its left hand end, as viewed in Fig. 1, with an outlet nozzle generally denoted by 4, Fig. 1, and the passageway of the outlet is connected in common to the interior passages of the body 1 and the valve body portion 3. At the junction of this passage connection, the outlet nozzle wall is enlarged spherically as at 15, to provide clearances for the action of the closure member V, as will hereinafter be described.

The body 1 is further provided at its opposite, or right hand end, as viewed in Fig. 1, with a hex or wrench section 13, and is externally threaded as at 6, for connecting the valve to any desired fluid source, in the usual manner.

The valve body portion 3 has slidably mounted therein a closure or cut off valve member generally denoted by V, which is in a single piece, is cylindrical in cross section, and comprises an enlarged guide head 20, which slidably fits in the bore 20', and a reduced, cylindrical guide portion 21, which slidably fits the bore 21', the intersection of the two portions 20 and 21 being angularly formed, as at 22.

The point of intersection of the bores 20' and 21', Fig. 1, is also angled, as at 19, to form a compression seat with the angular ledge 22 when the valve member V is opened, as seen in Fig. 2, thus to form a leak-proof seating of valve member V.

The lower face of the end of valve member V is cut at an angle of forty five degrees to the axis of said valve, as shown in Figs. 1, 2 and 3. This lower end of valve member V is also provided with an inclined, through passage 16, the inlet end of which is located at the angle seat or face, and the outlet end of which is located at the cylindrical face of the valve member V opposite the angle face, said port 16 being slightly inclined and thus leaving a web 17, which forms the angle seat and closure means for controlling the fluid flow through the valve.

Coacting with the vertical valve member V and its angled face is a second horizontal line valve member, generally denoted by Y, Figs. 1, 2 and 6 and 7. This valve member is similar, in some of its constructional details, to valve member V. At its point of contact with valve member V, valve member Y has a forty five degree angled contact face 11, formed by a crossing web 11'.

Valve member Y has an enlarged cylindrical guide portion 9, and a reduced guide portion 14 which ends at the angled face 11, the intersection of both guide portions 9 and 14 being merged into an angled ledge 12, which when the valve is closed, as in Fig. 1, compressively seats against the angled seat 12, in the stepped guide bore 29, thus to compressively seat the valve member Y in a leak proof manner. The valve member Y is provided with a through passage B, its inlet end being provided with a spring seat or groove 30, Figs. 1 and 6, and its outlet end provided with passage 10 and the previously mentioned cross web 11.

At the inlet end of valve member Y, and as at 30, is seated a coil spring 7, the opposite end of which is seated in an adjustable, spring tensioning sleeve 5, which is threadedly mounted in bore 29 of the body 1 and has a through bore C. The purpose of this latter construction is to furnish means for spring tension on the valve member Y towards its angled stop seat 12', but, more importantly, to supply the valve member Y with a constant tension with the direction of the incoming fluid line flow, and against the angled contact face of the valve member V, which in turn is itself tensioned towards its angular face contact with valve member Y, by a compressed coil spring 28, Fig. 1, which is tensioned between the top of valve member V and an integral flange 27 on stem 26. A teat 23 on the top of the guide portion 20 fits the interior of coil spring 28, to keep it in operative position. The stem 26 at its lower end is rounded as shown dotted in Fig. 1 and the teat 23 is similarly recessed to seat the rounded end of stem 26, as shown dotted in Figs. 1, 3 and 4.

With the valve assembled, as above described and as shown in Fig. 1, wherein the valve is closed against fluid flow, to open the valve to allow liquids to pass therethrough the stem 26 is screwed downwardly by its handle H, and this causes valve member V to press valve member Y at the angular contact faces, and as valve member V moves downwardly to uncover ports 10 and 16, as shown in Fig. 2, the line valve member Y moves to compress spring 7, and thus to fully open the ports to permit passage of fluid therethrough. When valve member V reaches its compression seat 19, it is stopped from further movement by its angled ledge 22, and is thus seated against leakage in this position.

Screwing the stem 26 upwardly releases the valve member V and it is forced upwardly by the action of valve member Y under the influence of its spring 7, and valve movement is finally stopped when the angular ledge 12 of valve member Y reaches its angular seat 12' and the webs 11' and 17 have again closed the passages as shown in Fig. 1.

Obviously, constant use of this valve structure tends to keep the angular faces at 11 constantly clean due to the wiping action thereof and also tends to lap the angular faces smooth and thus keep them in a water tight fit. In the sliding action the structure of these faces, furthermore, is lubricated by whatever fluid is passed therethrough, and the valve needs no keying as the pressure between the slidable members keeps them in floating active contact, with no tendency to rotate, and are thus free for accommodation to a perfect wear fit.

While the contacting angular faces of the members V and Y are shown flat in Figs. 1 to 7 inclusive, they may also be transversely angled, as shown in Fig. 9, wherein, in addition to the forty five degree angle of Figs. 1 to 7, a second V-shaped angle is substituted for the flat contact face so that there is additionally developed supplemental angular guiding and contact faces 46—46 on valve member V and complementary, coacting supplemental angular faces 45—45 on valve member Y, as in Fig. 9. The action of the structure of Fig. 9 is the same as that described for Figs. 1 to 7, with the added advantage of increase in the area of the contacting sliding valve member closure surfaces, with a consequent increase in the resistance to wear.

In Fig. 8 is shown a modified form of valve, in which the body 34 and its cylindrical valve body portion 33 and discharge spout 36 are about as previously described, the portion 33 being in threaded connection with stem plug 32, which in turn threadedly mounts a rotatable valve actuating stem 38, which contacts with the hollow closure valve member 40. Valve member 40 has a web at its lower end which forms a forty-five degree angled contact closure element 42, which in turn contacts with the angled face 11' of line valve member 41, which has the rear, tensioning coil spring 7 adjustably held by the threaded ported sleeve 5, whereby both valve members are held in face to face contact under tension, at all times and positions.

To operate the valve of Fig. 8, to open the same, the stem 38 is rotated to permit the valve member 40 to move upwardly under the tension of spring 7, and permitting line valve member 41 to move forwardly under the tension of spring 7, as the stem 38 is backed away. The valve member 41, having a through passage B', thus has its discharge port 10' opened as valve member 40 recedes upwardly.

To close this modified valve, the stem 38 is screwed downwardly. The function and principle of this valve is identical with the valve of Fig. 1, except that the operation of the stem is reversed in Fig. 8 over that of Fig. 1.

In some instances it may be found desirable to provide one or both valve members V and Y with means to prevent misalinement thereof from their axial operative positions, and to this end they may be provided with keyways 47 and keys 48, Figs. 1 to 5, and 8.

In Figs. 1, 2 and 8 the key 48 is shown as a pin in the body portion 3, and the keyway 47 is cut elongate in the side of the enlarged end 20 of valve member V.

Having thus described the invention, what is claimed is:

1. A valve comprising a body portion having an inlet port and an outlet port, two movable, contacting, ported valve members therein mounted at angles to each other and normally positioned so as to close communication between the ports therein, said valve members at their contacting points having angled faces comprising overlapping webs, said webs having ports therein and means for causing said members to move on their contacting faces to mutually open communication between all of said ports.

2. A valve comprising a body portion having an inlet port and an outlet port, two movable, contacting, ported valve members therein mounted at angles to each other, said members at their contacting points having angled faces comprising overlapping webs, said webs having ports therein, means for retaining said members in face to face contact and means for moving said members to open and close communication between the ports therein.

3. A valve comprising a body portion having an inlet port and an outlet port, two movable, contacting, ported valve members therein mounted at right angles to each other to control said inlet and outlet ports, said members at their contacting points having angled, sliding faces comprising overlapping webs, said webs having ports therein opening into the ports in said members, means in said body for causing said members to slide on their contacting faces to mutually open and close communication between all of the ports, said means comprising means for constantly tensioning the members into operative contact on their angled, sliding faces.

4. A valve comprising a body portion having an inlet port and an outlet port, two movable contacting, ported valve members therein mounted at right angles to each other to control said inlet and outlet ports, said members at their contacting points having angled sliding faces comprising overlapping webs, said webs having ports therein opening into the ports in said body, means for causing said valve members to slide on their contacting faces to mutually and simultaneously open and close communication between all of said ports, said means comprising means for constantly and opposedly tensioning the valve members towards each other into operative contact on their angled, sliding faces.

5. A valve comprising a body portion having an inlet port and an outlet port, two movable contacting, ported members therein mounted at right angles to each other to control said inlet and outlet ports and normally positioned so as to close communication between all of said ports, said valve members at their contacting points having angled sliding faces comprising overlapping webs, said webs having ports therein opening into the ports of said body, means for causing said members to slide on their contacting faces to mutually open communication between all of said ports, means for slidably keying said members to said body and means for constantly and opposedly tensioning the valve members towards each other into operative contact on their angled, sliding faces.

6. A valve structure as set forth in claim 1, in which the body and valve members have compression leak-proof seating means therebetween.

7. A valve as set forth in claim 3, in which the valve tensioning means comprises a compressed spring at that end of each valve member, remote from its angled face, one valve member having a stronger spring thereon than the other.

8. A valve comprising a body including angularly positioned line and operating portions having therein communicating bores; a valve member having a passage therethrough and slidably mounted in the line bore and having thereon an inclined closure web, said web having therein a passage, means urging said member to normally hold said web in position for closing the bore; a valve operating member slidably disposed in the other bore and having an inclined closure web for slidably engaging the first web, said second web having therein a passage normally out of registry with the first passage, and manually operative means for sliding the second mentioned member so as to slide the line member against the action of the first mentioned means whereby to align said passages for opening the line bore.

9. A valve comprising a body including a line portion and an angularly disposed portion, said portions having therein communicating bores, a tubular valve member slidably mounted in the bore of the line portion and having thereon a closure web, said web having therein a passage, means yieldably urging said member to normally hold the web in position for closing the bore; a valve operating member slidably mounted in the bore of the second portion and having a closure web for slidably engaging the first web, said second web having also therein a passage, said passages being normally closed by the imperforate portions of the respective webs, and manually operative means extending from the second mentioned member so as to slide the same, whereby to also slide the tubular member for aligning said passages so as to open the line bore.

10. A valve comprising a line portion, a portion vertical to the first portion and having thereon a threaded cap, said portions having therein communicating bores, a tubular valve member slidably mounted in the line bore and having an inclined closure web disposed opposite the other bore, said web having in a portion thereof a passage, spring means urging said member to normally hold said web in position for closing the line bore, a second valve member slidably disposed in the vertical bore and having an inclined closure web for slidably engaging the first web, said second web having also in a portion thereof a passage, said passages being normally closed by the imperforate portions of the respective webs; manipulating means threadedly mounted in the cap and having its inner end frictionally engaging the vertical member, whereby on operation of said means the vertical member may be slidably moved inwardly so as to also slide said tubular member, whereby to align said passages for opening the line bore.

11. A valve comprising a body having a tubular line portion, a portion vertical to the first portion and having therein a bore which communicates with the bore of the line portion; a tubular valve member slidably mounted in the line bore and having an inclined closure web disposed opposite the other bore, said web having in a portion thereof a passage; said line portion having an expansion of its bore also opposite the other bore; spring means, urging said member to normally hold said web in position for closing the line bore; a second valve member slidably disposed in the vertical bore and having an inclined closure web for slidably engaging the first web, said second web having also in a portion thereof a passage, said passages being normally closed by the imperforate portions of the adjoining webs; and means for sliding the second mentioned member so as to urge its web substantially into said bore expansion, whereby to also slide said tubular member against the action of the spring means, so that said passages may then become aligned whereby to open the line bore.

12. A valve comprising a tubular body including a line portion, a second portion vertical to the first portion, said portions having communicating bores, a tubular valve member slidably disposed in the line bore and having on its inner end a closure web, said web including an imperforate friction face and having in one part thereof a passage, said face being disposed on a plane which is inclined to the respective bores; means for urging said member inwardly, said member being in outward position when the valve is open, said means including an expansible coil spring; a second valve member slidably disposed in the bore of the vertical portion and also having a closure web, said latter web having an imperforate face for frictionally engaging the first face, the second mentioned web having also in one part thereof a passage, said passages adapted to be aligned to maintain the line bore open, the second mentioned valve member being then in inward position; and manipulable means adapted to hold said second mentioned valve member in inward position and maintain the line bore open and adapted to be moved to a position for allowing the second mentioned member to slide outwardly whereby to position said imperforate faces for closing the line bore, said coil spring being then adapted to urge the tubular member inwardly, the action of the tubular member being adapted to urge the second mentioned member outwardly.

NATHANIEL SUTCLIFFE.